Jan. 30, 1923.  
F. G. LORENS.  
FOLDING CAMPING BODY FOR AUTOMOBILE TRUCKS AND OTHER VEHICLES.  
FILED JUNE 5, 1922.

INVENTOR.  
F. G. LORENS.  
BY HIS ATTORNEY.  
James F. Williamson

Jan. 30, 1923.
F. G. LORENS.
FOLDING CAMPING BODY FOR AUTOMOBILE TRUCKS AND OTHER VEHICLES.
FILED JUNE 5, 1922.
1,443,792.
2 SHEETS—SHEET 2.
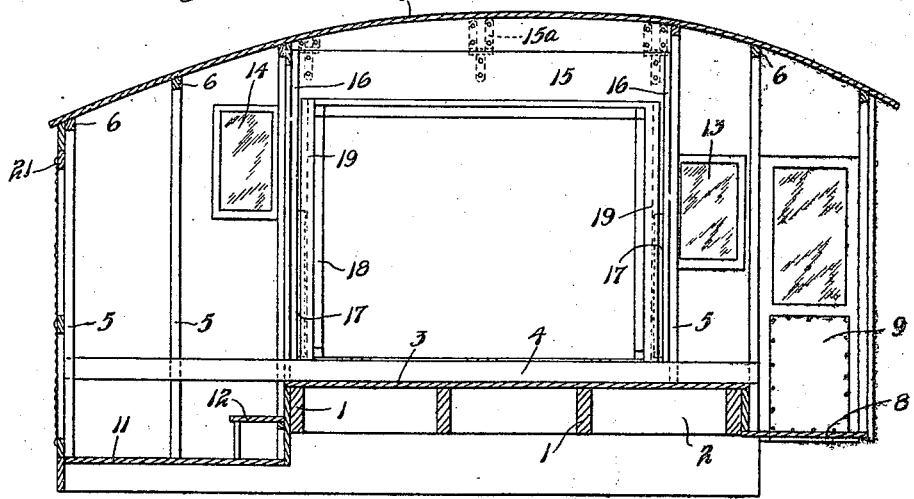
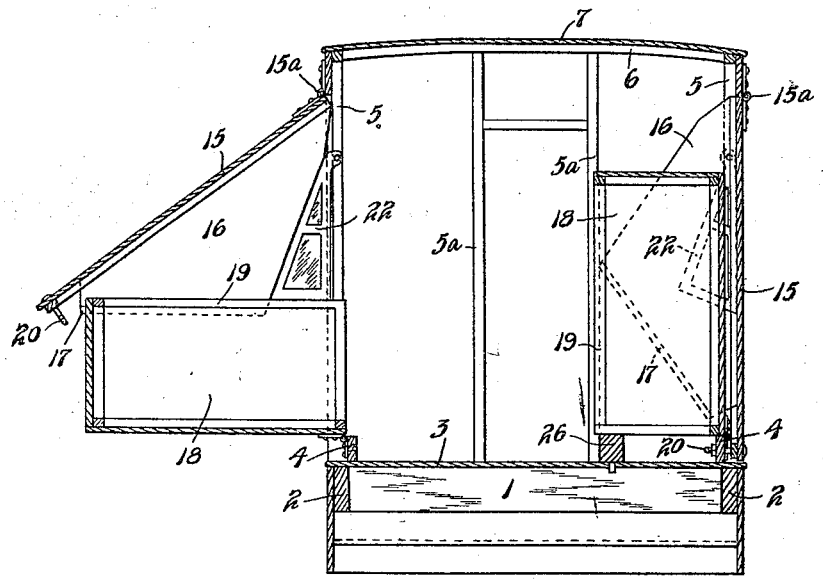
INVENTOR.
F. G. LORENS.
BY HIS ATTORNEY.
James F. Williamson Patented Jan. 30, 1923.

1,443,792

UNITED STATES PATENT OFFICE.

FRANK G. LORENS, OF CENTER CITY, MINNESOTA.

FOLDING CAMPING BODY FOR AUTOMOBILE TRUCKS AND OTHER VEHICLES.

Application filed June 5, 1922. Serial No. 565,799.

*To all whom it may concern:*

Be it known that I, FRANK G. LORENS, a citizen of the United States, residing at Center City, in the county of Chisago and State of Minnesota, have invented certain new and useful Improvements in Folding Camping Bodies for Automobile Trucks and Other Vehicles; and I do hereby declare the following to be a full, clear, and exact description of the invention, such as will enable others skilled in the art to which it appertains to make and use the same.

This invention relates to a body adapted to be placed upon an automobile or other wheeled frame and having housing compartments therein. The invention is particularly designed to form a portable camping structure which is adapted to form a closed compartment forming body and which is extensible to form covered and roomy sleeping compartments.

It is an object of this invention to provide a simple and efficient structure of body which can be readily mounted upon a portable frame and which will form a closed convertible and convenient housing structure which can be readily and easily extended to form sleeping compartments.

It is more specifically an object of the invention to provide such a body having in one compartment thereof hinged sides capable of swinging outwardly and upwardly and also having bed frames normally disposed in the body also swingable outwardly, which frames are supported by said swingable side members.

Other objects and advantages of the invention will be fully set forth in the following description made in connection with the accompanying drawings in which like reference characters refer to the same parts throughout the different views, and in which, Fig. 1 is a view in side elevation of the body mounted upon an automobile truck showing the same in extended position;

Fig. 3 is a vertical longitudinal section taken on the line 3—3 of Fig. 2; and

Fig. 4 is a transverse vertical section taken on the line 4—4 of Fig. 1.

Figure 1:
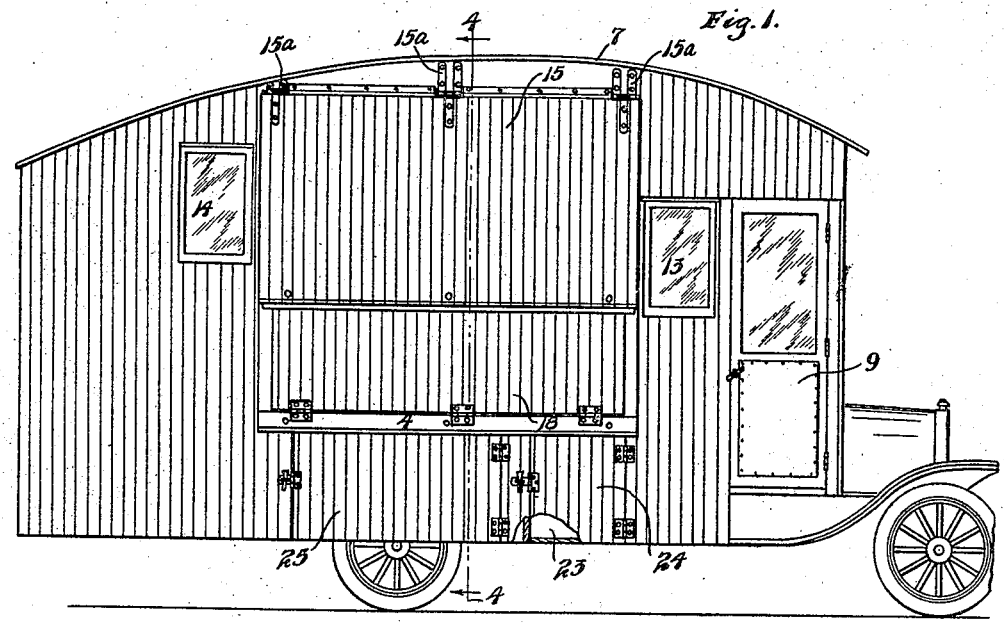
Figure 2:
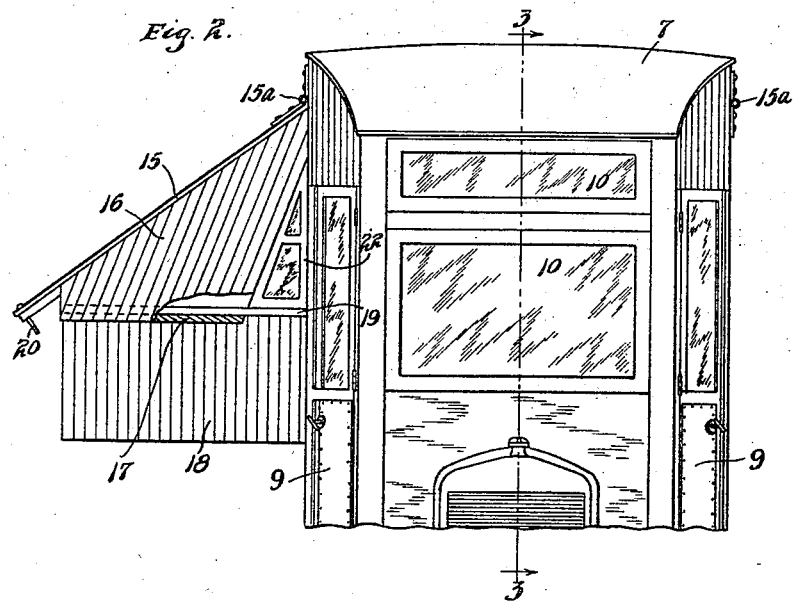
Fig. 2 is a view in front elevation of the device, the lower portion thereof being omitted.

Referring to the drawings, the device comprises a frame having transverse cross members or joists 1 connected by two joists 2, which frame carries the floor 3 of the main or central compartment of the body and is adapted to rest and be supported upon the frame of an automobile or other vehicle base. Longitudinally spaced members 4 are disposed on the floor 3 and extend through the main compartment and to the rear thereof. These members support spaced vertical members 5 which, in turn, carry the upper transverse members 6 supporting the roof 7, which roof is shown as downwardly curved at the front and rear thereof. Additional spaced vertical members $5^a$ are disposed substantially in line with the vertical members 5 at the rear of the floor 3, which vertical members are connected by a cross piece adjacent the top thereof. The compartment having the floor 3 may be called the main compartment and a forward compartment is provided having the floor 8 in a lower plane than the floor 3, which forward compartment is provided with side entrance doors 9 of any suitable and standard construction, the front of said forward portion being provided with windows 10 in the same manner as the forward part of the standard closed automobile. A rear compartment is also provided having a floor 11 also disposed in a plane below the floor 3, step and seat forming members 12 being disposed adjacent the central compartment intermediate the floors 3 and 11. The central or main compartment is also provided adjacent its forward end with windows 13 and the rear compartment is provided adjacent its forward end with windows 14 at each side thereof.

The central or main compartment has sections 15 of its side members hinged at their upper edges on a horizontal axis by hinges $15^a$ of any well known type so as to swing outwardly and upwardly and these sections are provided adjacent their end edges with inwardly extending partitions 16 fixed thereto, which partitions are substantially triangular in shape or have their inner edges converging. The partitions 16 are provided along their lower edges with inwardly extending cleat members 17 for a purpose to be later described. Also disposed in the main compartment and normally standing upright therein are rectangular bed frame members 18, which are open at their inner sides and have their closed outer or bottom sides hingedly connected to the longitudinal members 4, as clearly shown in Fig. 4. Blocks 26 are suitably disposed on the floor 3 to support the inner edges of the frames 18 when in inward position. These frame members 18 are provided along their upper or open longitudinal edges with projecting cleats 19 and when the sections 15 are swung upwardly and outwardly, and the frames 18 swung outwardly, as shown in Fig. 4, the cleats 19 rest upon the cleats 17, which latter forms the supporting means for the frames in such outwardly swung positions. As the sections 15 swing outwardly, the partitions 16 thus form closures for the ends of the space between the same and the side of the body. Additional triangular panels 22 are provided for filling in the space between the edges of the partitions 16 and the vertical members 5, each of which panels may be removable and is shown as pivoted at its upper edge to the vertical member at the end of the main compartment. This panel will then swing inwardly between the partition 16 and the vertical member 5. The sections 15 are provided adjacent the lower horizontal edges with inwardly projecting bolts 20, which, when said sections are swung to closed position, as shown on the right hand side of Fig. 4, pass through apertures in the members 4 and receive nuts holding and locking the same in closed position.

The bed frames 18 are adapted to receive bed springs or other suitable bed equipment which can be retained therein at all times.

The rear compartment is provided with an entrance door 21 preferably of the usual screen door type.

The sides of the body extend below the line of the floor 11, as shown in Figs. 1 and 3 and a compartment 23 is formed beneath the main compartment and is provided at its ends with hinged doors 24 provided with suitable latching means. In order to give ready access to the wheel of the automobile in case of any trouble therewith another door 25 is provided hinged to the side opposite said wheel which door is also provided with suitable latching means for holding the same in closed position.

It is thought from the above description the operation of the device will be obvious. The device in closed position will be disposed as shown at the right of Fig. 4, and while traveling will be in this position. When it is desired to arrange the body for sleeping, the sides 15 are released and swung upwardly and the bed frame 18 swung outwardly, as shown at the left of Fig. 4.

A convenient sleeping compartment is thus provided which is roomy, comfortable and well protected from the weather. The various compartments of the device can be equipped with various cooking or other utensils essential on a camping trip and the device will furnish a complete dwelling or shelter at all times. The parts of the device are both simple and can be easily and inexpensively made from standard material and quickly and easily mounted on a Ford or other standard type of automobile. The device has been amply demonstrated in actual use and has proved very efficient for the purposes had in view.

It will, of course, be understood that various changes may be made in the form, details and proportions of the parts without departing from the scope of applicant's invention, which, generally stated, consists in the matter shown and described and set forth in the appended claims.

What is claimed is:

1. A camping body for a vehicle base comprising, a main compartment, the sides of which are hinged at their upper edges for outward and upward swinging movement, partitions extending inwardly and normal to said sides adjacent the ends thereof to close the end space between the same and the sides of said body, bed frames disposed in said compartment hinged adjacent their lower outer edges to swing outwardly to substantially horizontal position, and means on said partitions supporting said frames when both are in outwardly swung positions.

2. An extensible camping body adapted to be placed on a truck comprising, a main floored compartment, front and rear compartments with floors at lower elevation than the floor of said main compartment, side walls for said main compartment having sections hinged adjacent the top of the body, and rectangular bed frames normally disposed in said main compartment hinged adjacent the floor thereof to swing outwardly to substantially horizontal position adapted to be supported by said sections when the same are swung outwardly and upwardly.

3. A camping body adapted to be supported on a wheeled base comprising, a main compartment, longitudinally spaced vertical members at the ends thereof, side walls hinged on horizontal axes at their upper edges, partitions extending inwardly and normally to said side walls adjacent the ends, said partitions having converging inner edges, said side walls being adapted to swing outwardly and upwardly to bring the lower one of said converging edges substantially to horizontal position, rectangular bed frame members normally disposed upright in said compartment but hinged to swing outwardly to substantially horizontal position, cleats on the sides of said frames, and supporting cleats on the lower edges of said partitions engaged by said first mentioned cleats and forming the supporting means for said frames.

4. The structure set forth in claim 3, and triangular panels pivoted to each of said spaced vertical members and adapted to fit between the same and the upper of said converging edges of said partitions when said sides are swung outwardly.

5. A camping body adapted to be supported by a truck frame having in combination, spaced transverse members adapted to rest upon the truck frame, a main compartment floor on said members, spaced longitudinal frame members on said floor extending throughout said main compartment and to the rear thereof, spaced vertical members supported by said longitudinal members, a rear compartment supported by certain of said vertical members having a floor at a lower level than the floor of said main compartment, said main compartment having hinged side sections and outwardly swinging bed frame sections adapted to be supported by said side sections when in outwardly swung position.

6. An extensible camping body adapted to be placed on a truck comprising, a main compartment, the sides of which are hinged at their upper edges for outward and upward swinging movement, bed frames disposed in said compartment hinged adjacent the lower outer edges to swing outwardly to a substantially horizontal position, and means on said sides supporting said frames when both are in outwardly swung positions.

In testimony whereof I affix my signature.

FRANK G. LORENS.